Daniel Silverman

INVENTOR.

Daniel Silverman

INVENTOR.

*Daniel Silverman*

*INVENTOR.*

Daniel Silverman

INVENTOR.

United States Patent Office 3,179,001
Patented Apr. 20, 1965

3,179,001

METHOD AND APPARATUS FOR STORING ON AND RETRIEVING INFORMATION FROM MULTIPLE INFORMATION STRIPS

Daniel Silverman, 5969 S. Birmingham, Tulsa, Okla.
Filed Dec. 8, 1961, Ser. No. 158,000
31 Claims. (Cl. 88—24)

This invention relates to the art of storage and retrieval of information by means of microfilm strips. The information may be stored on the film in the form of patterns of spots, or by means of micro-reduced images of printed information, or pictures, or by a combination of both. In any case, the information units or exposures on the film strip are indexed by a code of spots arranged in predetermined patterns.

More specifically it relates to an information storage system in which a great number of units of information on a multiplicity of films can be indexed, stored, and scanned so that a given unit of information can be located, read, photographed, or otherwise utilized, in an extremely short time.

In this type of information storage, there are two principal classes of designs. One calls for the use of long microfilm strips on reels, which are rapidly traversed past a scanning system, which will locate the particular unit. This system has the advantage of a high rate of scan, but it has the disadvantage of having to scan possibly a complete reel to find the one unit of information desired. The other class of design calls for the units of information to be placed separately or in small groups, on individual small cards or short strips of film. With this system, a unit can be selected rapidly by choosing an appropriate group of such cards or strips and rapidly scanning the relatively small number of cards to find the one that holds the desired unit of information.

In this invention I propose a system which is a combination of the best features of the above two classes of designs. Namely, the use of a continuous film strip with its rapid scanning, plus the feature of dividing up the total length of film into many reels each of which may be broken up into many sections, with means to select one of the many possible sections to apply to the rapid scanner.

There are a number of important objectives of this invention as follows:

To store information in high density on microfilm and to provide a system for indexing and scanning the microfilm such that a given item of information in storage can be located with a minimum of delay.

To so construct the microfilm and scanning system and to index the film that any desired section of the film can be presented to the scanning array promptly.

To divide the total length of film into sections which can be presented selectively to a single high speed scanning system, and to preselect the sections of interest on a multiplicity of films at the same time that the scanner is searching one of the films.

To provide a single precise optical system and scanning array which can be used to selectively scan any one of a multiplicity of microfilms.

To provide a multiple gate film system so that a multiplicity of films can be simultaneously in process of rough positioning while the optical and scanning system is scanning the microfilm in one film gate.

To provide a microfilm camera to photograph a particular unit of information as soon as the scanning system has found it.

To provide a system of information retrieval in which the scanning of a second film strip can be in progress while the camera is reproducing a unit of information on a first strip.

To provide a multiplicity of films in a multiplicity of film gates in such a geometrical-optical array that the scanning system can be switched rapidly from one gate to another.

To provide a system in which a scanner can see a unit of information as it passes by either of two film gates positioned longitudinally with respect to each other, controls being exercised to slow the film as it passes the first gate, and to stop it when it reaches the second gate.

To provide a system of information retrieval in which digital information is recorded on long digital record strips with multiple strip-handling-units through each of which one or a multiplicity of such strips can be run selectively and successively. Each of said strip handling units can drive their strips independently of the others, and with simple section index marks on the strips, index detectors on the strip handling units and appropriate controls, the strips can be positioned to pre-selected sections "off-line," at the same time that one of the strips in one of the strip handling units is being scanned "on-line" by a central scanning system.

The foregoing and other objects of this invention are accomplished by an information storage and retrieval system which comprises a multiplicity of reels of microfilm, each of which is adapted to be traversed through one of a multiplicity of film gates. These film gates are arranged in a geometric pattern, so that a precise optical system can be presented to each of these gates in turn, to image the microfilm therein onto a photoelectric scanning array. To accomplish this, for example, the film gates can be arranged in radial symmetry, with the optical system rotatable about an axis through the axis of symmetry and perpendicular to the plane of the film gates. The optical system, and thus the scanning array, can be focussed selectively onto any one of the film gates very quickly. Thus the total number of information units can be broken into groups, as many, "X" as there are film gates, so that the scanning array need not look through the total length of film to find a given unit, but need only scan no more than $1/X$ of the total.

It is also a part of my invention to apply to the microfilm strips on the separate reels a simple indexing system, which will in effect break the total length of the film on each reel into as many, "Y," sections as desired. Thus out of the total length in each reel only $1/Y$ need be scanned. Rough positioning of the film strip in the film gate will select one of the sections, Y, that is to be scanned. This rough positioning can be done simply by methods well known in the art. Each of the films in each of the film gates can be in process of pre-positioning or selection at any given time. As soon as one has been positioned to its proper Y position, the optical system is quickly positioned to scan that gate and will promptly search for the desired unit.

I contemplate also, in this invention that for each film gate there can be a multiplicity, "Z," of film reels, any one of which can be selectively run into that film gate. Of course, after one of these films has been scanned, it must be withdrawn from the gate before another can be run into the gate.

By this process, I can select a small part of the total length of film, namely, $1/X \cdot Y \cdot Z$ of the total to precisely scan, to find the desired unit of information. Also, I contemplate making the film strips wide enough to provide a number, "W," of columns of units of information placed side by side on the film. This will reduce by another factor $1/W$, the total length of film that must be scanned to find the desired unit of information.

Since long microfilm strips can be scanned more rapidly than can short strips or cards, my system provides an ideal combination of many sections of film, any one of which can be pre-selected, plus the possibility of rapid scanning, to provide a system in which the time for the location of an item of information can be as small as desired.

Associated with the optical system is a microfilm camera which can be made to take a picture of any desired unit of information in a film gate selected by the scanning system. This photograph can be taken by flash photography while the microfilm is moving. Or the microfilm can be stopped and the photograph taken. In any case, once the scanning array has located the information unit it can move to a new film gate and start scanning while the camera is still pointed to the last film gate. As soon as the picture is taken the film in the camera is advanced and the camera rotated to face the same gate that the optical system sees.

The many details and embodiments of my invention and the many purposes and objectives will be better understood by reference to the accompanying drawings forming a part of this application, in the various figures of which drawings the same reference numerals are applied to the same or corresponding parts. In the drawings.

Figure 1:
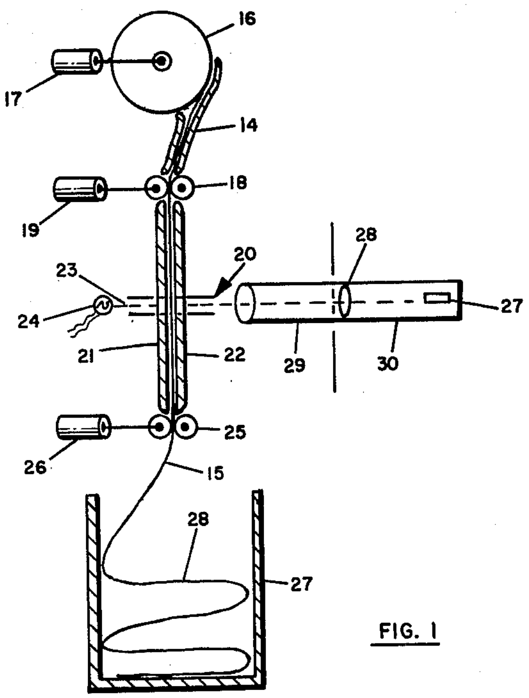
FIGURE 1 illustrates, in schematic vertical view, one embodiment.

Referring now to these drawings in detail, and particularly to FIGURE 1, I show in schematic form one version of my invention. This includes a microfilm strip 15 wound on a reel 16. The reel can be driven by motor 17 to feed the strip out, or to reel the strip in. The strip passes between guides 14 to rollers 18 that can be driven separately by motor 19.

The film 15 is driven by means of motors 17 and 19 through the film gate 20, which may, for example, be constructed of guide plates 21 and 22. The film gate may also include rollers, etc., as is well known in the art, to guide the film strip and hold it steadily in the plane of the film gate while it is being traversed rapidly. The film strip then passes to rollers 25 driven by motor 26. The film then passes into a film receptacle 27 into which the strip falls in folds 28. Much of the detail of film drive, film gate and receptacle can follow the art which is well known. By proper design of drives and with continuous guides the film can be rapidly fed from the reel through the film gate and into the receptacle and also be quickly withdrawn from the film gate. This type of film drive in which the film strip can be threaded through the film space automatically, and advanced or withdrawn at will, is utilized in commercial optical instruments and film readers. One of these is the Recordak Lodestar Reader, manufactured by the Recordak Corp. of Rochester, N.Y. The specific arrangement of controls, drives, guides, reels, etc., are not part of this invention, and any one of many different styles can be adapted to this purpose. Further description is felt to be unnecessary in view of the state of the art.

Figure 2:
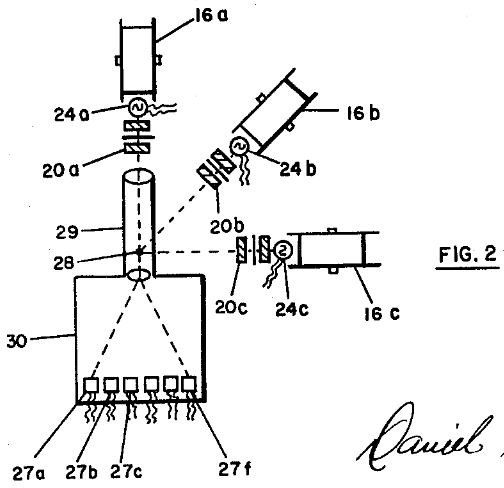
FIGURES 2 and 3 illustrate schematically in plan view two embodiments in which the relative position of film gates and optical-scanning system is altered by mechanical means.

Behind the film gate 20 is an illuminating system shown schematically as 24. This is to back-light the film strip and thus to present to the optical system 29 a pattern of bright spots of light representing at least a part of the information on the microfilm. The optical system is arranged to present an enlarged image of the illuminated film in gate 20 onto the scanning array 27. As shown in FIGURE 2, this is an array of separate photoelectric detectors *27a*, *27b*, . . . *27f*, arranged in the focal plane of the optical system. The scanning and optical elements are enclosed in a light tight container 30.

Normally the leads from the photoelectric detectors *27a*, *27b*, etc., would go to appropriate logic circuits which would recognize when a particular combination of spots was observed, and thereupon place certain controls on the instrument in line with previous logical instructions. Since this art has progressed to the point where a number of equipments are commercially available which will accomplish these logical steps, and since the electronic circuitry required to accomplish these steps are not part of this invention, it is not felt to be necessary to describe this circuitry further. The Benson-Lehner "Flip," manufactured by the Benson-Lehner Corporation of Santa Monica, California, the I.B.M. "Walnut," manufactured by the International Business Machines Corporation of New York, N.Y., the National Bureau of Standards "Microfilm Rapid Selector" and other similar devices, all utilize this type of logical circuitry. U.S. Patent #2,873,912, "Electronic Comparator" describes in detail the circuits for construction of an electric comparator for comparing the patterns of spots, such as might be found on punched paper tapes, etc. Also, the book "Tools for Machine Literature Searching" by J. W. Perry and Allen Kent, Interscience Publishers, New York, 1958, Chapter 18, pages 489–579, describes another type of digital scanning and selecting system for searching for specific patterns of bits. There are also many textbooks on computers, such as "Computer Logic—The Functional Design of Digital Computers," by Ivan Flores, Prentice Hall, Inc., 1960, which describes many logic circuits for making comparison of multi-bit patterns, and as the result of the comparison, taking particular control steps previously decided upon. U.S. Patents #1,889,575, "Method and Apparatus for Reading Books and the Like," #2,121,061, "Method of and Apparatus for Indexing and Photo-Transcription of Records," and #2,830,285, "Storage System," and many others all show various types of scanning and control systems that might be adapted to the type of system described in this application.

In FIGURE 2 is shown a plan view of one embodiment. This includes a multiplicity of film gates 20*a*, 20*b*, 20*c*, etc., with appropriate reels 16*a*, 16*b*, 16*c*, etc., feeding microfilms 15*a*, 15*b*, 15*c*, etc., through the film gates as in FIGURE 1. Each of the reels represent a single reel or a multiplicity of reels (as will be explained in connection with FIGURES 8 and 9) utilizing respectively each of the film gates.

In this view, the film gates are arranged in circular symmetry, such that as the optical system 29 with its scanning system 27 is rotated about axis 28, each of the film gates will successively be focussed on the scanning system. In this way, the scanning system can be shifted from one microfilm to another in a very short time.

Figure 3:
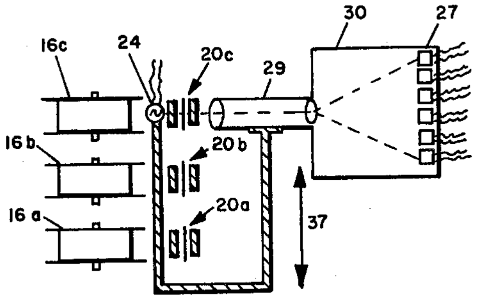

In FIGURE 3, I show another arrangement in which a multiplicity of film gates can be successively presented to the optical system 29. Here the gates are arranged adjacent to each other in a vertical plane. The optical and scanning systems 29, 30, 27, are arranged to move along the line of the arrow 37, parallel to the plane of the film gates. Thus the optical system successively focusses on each of the film gates in turn. The illuminating system 24 is shown here as part of the optical system and moveable with it.

Figure 4:
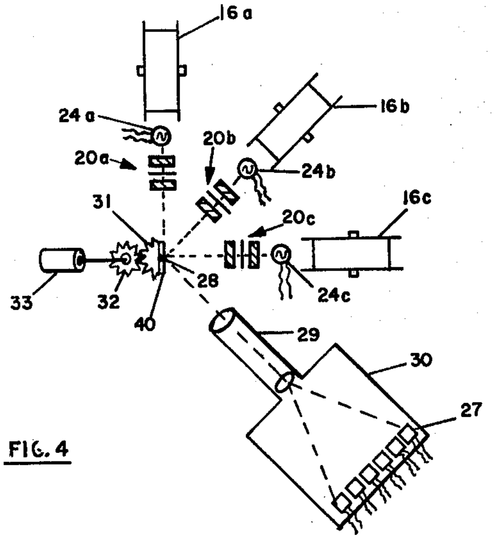

Similarly, I show in FIGURE 4 how a circularly symmetrical system such as in FIGURE 2 can, by the use of a rotatable mirror 40 (or other optical means) placed with its reflecting surface in the axis 28 of the film gate circle, successively present each of the film gates to the optical system 29. Because of the smaller mass of the mirror system it can be rotated by the motor 33, through gears 32 and 31 and repositioned more rapidly than can the complete optical and scanning system of FIGURE 2.

Figure 5:
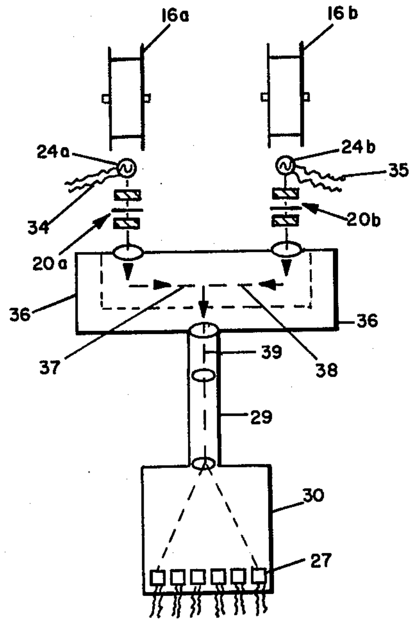
FIGURES 4 and 5 illustrate schematically in plan view two other embodiments in which the relative optical position of film gates and optical-scanning system is altered by optical means.

The optical system 29 can be switched from one film gate to another by other means, one of which is shown in FIGURE 5. Here are shown two film reels 16*a* and 16*b* (although as many such reels as desired can be handled in a similar way) parallel to each other and spaced apart a convenient distance. The two film gates 20*a* and 20*b* are read by the optical device 36 and the two images 37 and 38 are combined into one image 39 presented to the optical system 29, where the two separate images are superimposed on the scanning array 27. One way of doing this that is well known in the art is to use a semi-transparent mirror, and to *transmit* one image *through* the mirror to the optical system 29, and to *reflect* the other image *into* the optical system. Illumination units 24*a* and 24*b* respectively illuminate the film gates 20*a* and 20*b*, and the lights are controlled respectively by leads 34 and 35. With both illumination units 24*a* and 24*b* energized, the two images of 20*a* and 20*b* are presented to the array 27. By opening the power leads 34 or 35, one or the other of the two images is removed, and only one remains to be scanned. Thus the optical system can be switched rapidly by control of the illumination. Alternatively, moveable masks or similar means can be placed in the paths of the illumination or images and accomplish the same purpose. The design of the optical device 36 is well known in the art and forms no part of this invention.

Figure 6:
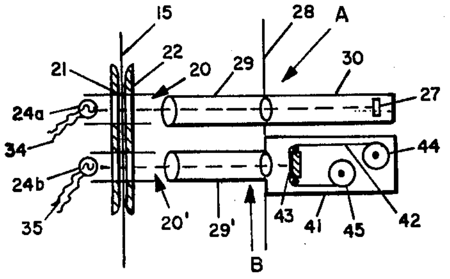
FIGURE 6 illustrates, in vertical view, a combination optical-scanner and microfilm camera.

In FIGURE 6, I show another embodiment similar to FIGURE 1 in which the optical scanning systems 29, 30, 27, is mounted on axis 28 and focusses the film in the plane of the film gate 20 onto the array 27. Shown mounted below the optical system 29 is another optical system 29′ which focusses the film in the film gate 20′ onto the surface of a photographic film 42 presented in a film gate 43. The film is reeled off supply reel 44 onto take-up reel 45 by means not shown, but well known in the art. Thus when the proper information unit is positioned in the light gate 20′ a microphotograph can be taken of the information therein and recorded on a separate film 42, or card, which can be developed and viewed. Of course, any type of photographic means may be used to duplicate the unit of information including all known kinds of emulsions and all kinds of backing materials. Conversely, if desired, the microfilm exposed in the film gate 20 can be viewed directly, or can be used in any other way such as by the use of closed circuit television and in similar ways well known in the art. However, in view of the importance of speed in the search for the particular information unit, and the cost of the optical and scanning systems and their control system, it would be most useful to photograph the information and permit the scanning system to continue to search for other information units required.

Figure 7:
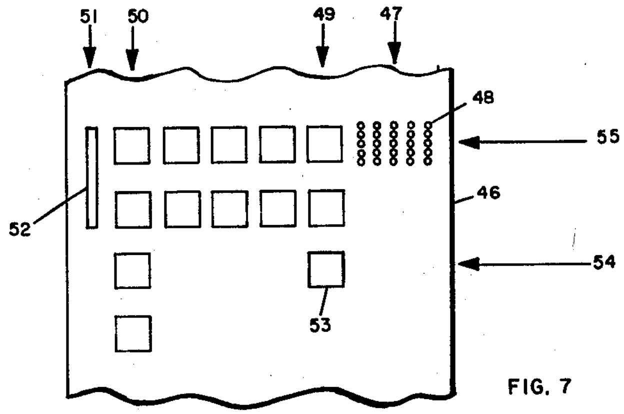
FIGURE 7 illustrates one embodiment of a microfilm strip showing columns of information units, patterns of spots including indexing information, and rough selection index.

To illustrate how these two parts, A, 29, 30, 27, and B, 29′, 41, of the optical system work, I will refer to FIGURE 7. This shows one possible type of microfilm that might be used as the information record. This might, for example, comprise a photographic film, strip 46 carrying a multiplicity of columns of information 47, 49,–50, 51, of different types. Column 47 represents information in binary form, or in the form of a pattern of spots. These can be dark spots on a light background, transparent spots on an opaque background, spots of one color on a bckground of a different color, or other optical combination, or any combination of them. For simplicity, assume that the spots 48 are transparent dots on an opaque background. This pattern can represent the entire information, in which case the scanning system 27 can read this very rapidly and store it electronically, or utilize it in any other way, as is well known in the art so that the photographic part B may not be required. Or, the pattern of spots may simply be an index, or an item of information identifying one particular piece of information, say 53 stored on the film. Information 43 may, for example, be a microphotograph of printed or pictorial information, or other kind. Thus, while the part A of the optical system of FIGURE 6 is scanning column 47 and reading the spot information, the part B of the optical system is looking at the pictorial information in column 49. There may only be a single column of such information on the strip 46. However, it is possible to have a multiplicity of columns 49 to 50 of information of the type 43. Then part B can be positioned to look at any desired one of the columns. Due to the relative longitudinal positions of parts A and B of the optical system, while the part A is looking at row 55, for example, part B is looking at row 54. It is possible to take care of this by proper printing of the microfilm. Then when the scanner locates the particular row 55 it is looking for, the part B is looking at the proper row 54 and column 49 (say) that carries the information desired, such as 53.

It is possible by the use of flash photography to record the photograph of the information 53 onto film 42 without stopping the traverse of strip 46. However, it may be desirable to stop the strip 46 while photographing the information 53. In this case the part A of the optical system 29 can be repositioning and scanning another film strip in another film gate at the same time that the picture of 53 is being taken, all in the interest of saving time. This arrangement acts as a buffer to permit the scanner to keep busy scanning any one of the film gates for which the film has been pre-eselected to the proper section, while the camera is recording the information in the last unit. The relative rotation of part A of the optical system with respect to part B can be taken care of by means well known in the art.

Figure 10:
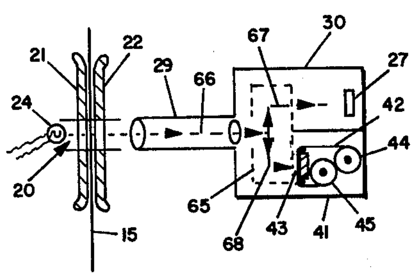
FIGURE 10 illustrates an embodiment of a simplified optical system combining scanner and camera.

In some cases it may be desired to have a simpler scanning system which would include both parts A and B of the apparatus shown in FIGURE 6. In FIGURE 10, I show a single objective optical system 29 carrying an image 66 of the film 15 in gate 20. By means of the optical device 65, the image 66 is split into two parts 67 and 68, going respectively to the photoelectric detector array 27 and to the microfilm camera 41. The design of the optical splitter 65 is well known in the art and is not a part of this invention. While this device in FIGURE 10 is considerably simpler and cheaper and requires fewer controls than that of FIGURE 6, it does not have the flexibility of the latter and will require more time to scan and copy a number of units of information.

My invention includes the idea of pre-positioning the film in each film gate to the proper section before scanning by the optical system takes place. By this means only one rapid accurate scanning unit is required to scan the selected section of the film, and simple selecting or scanning devices may be used to pre-position roughly, the film to the proper section. For example, the principal high speed scanner might be designed in accordance with my Patent #2,820,907 issued January 21, 1958, entitled Microfilm Apparatus. Or it might utilize the principles of my co-pending application SN 84,026 filed January 23, 1961, entitled Apparatus for the Storage and Retrieval of Information. In any case, the design of the scanning system will probably require a multibit pattern of spots 48 in the index column 47. At the least, the number of bits required will be such as to include the number of separate rows or units of information in each section of the film. The total number of separate rows of information on a film 1200 feet long can be of the order of 72,000 rows. Assuming that the number of sections in the film is 10, the number of rows per section will be 7200. Thus it will be seen that the complexity of range of the index scanner must be much greater than that of the section scanner. The index for the section scanner can be as simple as a single spot 52 in FIGURE 7, of light transmissive or reflective properties, or it might also be a spot or spots of magnetic material, or magnetized spots or a stripe of magnetic material, and so on. If a single spot is used, a counter in the detector circuit can be used to indicate the number of the section. There are many systems of simple indexing and counting that are well known in the art and shown in handbooks that can be used in the application. The essential point is that they are very much simpler than the principal high speed scanner 27, and so by the use of a multiplicity of simple selectors or scanners the more complex and costly high speed scanner can be used more efficiently.

Figure 8:
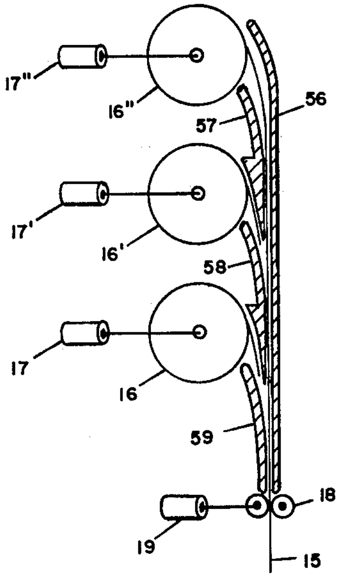
FIGURES 8 and 9 illustrate two ways in which a multiplicity of film strips can be selectively and sequentially run through a given film gate.

In FIGURE 8, I show a multiplicity of reels of film 16, 16', 16'', etc., each driven by appropriate motor means 17, 17', 17'', etc., as in FIGURE 1. By means of film guides or conduits such as 56, 57, 58, and 59, the strips from any one of the reels 16, 16', or 16'', can be fed selectively to the rollers 18 and driven through the film gate 20.

If desired, the film reels 16, 16', 16'', etc., can be mounted on a rotatable support 60 turning about axis 61 in FIGUR7 9. When properly indexed, this rotatable assembly will position any desired one of the reels 16, etc., to the proper position, such that guides 62 will conduct the film 15 from the reel through guides 63 and 64 to drive rollers 18. The film reels can be housed in self-feeding magazines driven by means not shown and be rapidly interchangeable so that any desired battery of film reels can be mounted as in FIGURE 8 or FIGURE 9 to be selectively traversed through the drive rollers into the film gate.

Figure 9:
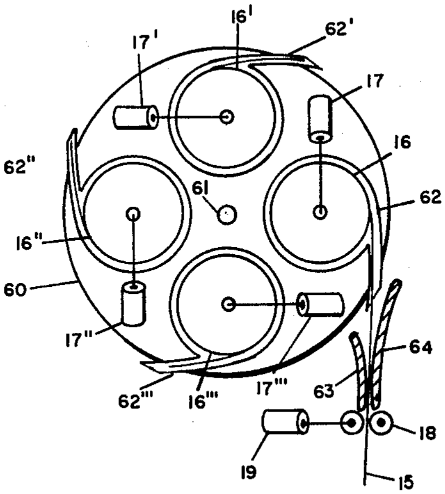

In FIGURE 1, I show a receptacle 27 into which the film from reel 16 is fed as the film is traversed through the film gate 20. This type of film receiver is desirable when a multiplicity of source reels of film 16, 16', 16'', etc., FIGURES 8 and 9 are used. However, when only a single large reel 16 is used, a conventional type of take-up reel can be used in place of the receptacle 27. In that case a single film is provided for each film gate, and the film is threaded through the film gate from source reel 16 to take-up reel, not shown. The film remains always attached to the two reels, so that it can be instantly run forward or backward at the command of the proper controls. It is desirable in that case to use some type of means, electroconductive, magnetic, optical, or other, as is well known in the art, to indicate when the film is approaching the end of the reel and thus stop the traverse of the film. Active information is stored only in the space between indicators. The remainder of the film, on each end, serves as leader.

It will be clear that in the case of FIGURES 8 and 9, where a multiplicity of films are arranged to be run selectively through the same film gate, proper control means or interlock means must be provided as is well known in the art, to insure that the film gate is completely free before a new film is run into the gate. Such an interlock can be a simple microswitch or photoelectric type of limit switch, as is well known in the art, commonly used to indicate when a drive system has reached its terminal position. Such a limit switch on each of the reel drives would show by their contacts when the film in each reel was withdrawn to its limit. These contacts would then be used in conjunction with the connections to the forward drives of all reels to prevent any reel from being driven forward unless all the films were withdrawn from the gate, and in their terminal positions. This type of circuitry is well known in the art.

Since the film is to be traversed rapidly through the film gate while being scanned, the film drive system can be provided with loops of film between the reels and the film gate to act as buffers, so that the film can be started and stopped rapidly without involving the inertia of the reels. This type of mechanism is well known in the art of photographic strip cameras, projectors and similar devices, including digital magnetic tape drives.

There are commercial film scanning systems such as the Benson-Lehner "Flip" which will traverse a single reel of film of length 1200 feet, carrying 60 units of information per foot, and capable of scanning the entire 72,000 units of information in the time of about 2 minutes, or at the rate of 36,000 per minute or 600 per second. In competition with this type of storage system is another commercial system such as the I.B.M. "Walnut" that utilizes 10,000 separate short strips of microfilm which are stored in groups of 50 in each of 200 separate containers. Each of the strips contains about 100 units of information, making a total of about 1,000,000 units in storage. While it takes about 1 minute to find the individual strip, the strip itself can be scanned in a matter of a few seconds to locate the proper unit.

According to the principles of this invention, this total number of units of information could be contained on 100 reels of film which would be constrained to operate so that 5 reels would operate in each of 20 film gates. Each reel might contain 20 sections and each film contains 5 columns of units of information. Thus each section of film would contain $\frac{1}{10,000}$ of the total film length, or in the case of the 1,000,000 units of information of the second apparatus above, each section would contain 100 units of information. Since there are 5 columns, this would involve 20 rows, or about 4 inches of film. This would be scanned at the rate of 600 per second and would be completed in $\frac{1}{30}$ second. Since the optical system can be switched in a matter of a second or two, the whole search would be over practically as soon as the optical system was switched. Twenty sections of film each 4 inches long would only occupy 80 inches or less than 7 feet of film. It will be obvious, in view of the first apparatus above, that a longer film than this can be used efficiently with a consequent increase in total storage capacity.

Let us assume that a maximum search time per section is set at 2 seconds. This would permit scanning 1200 rows per section, or 6,000 units of information. This would provide 12,000,000 units on all reels. The tapes would each carry about 120,000 units and be about 400 feet long. Using the proper pre-positioning of the film, this system, carrying almost 160 times as much information as the first system (Benson-Lehner "Flip") might be scanned in about $\frac{1}{60}$ of the time required for that system, giving a figure of merit of about 10,000. Compared to the second system (I.B.M. "Walnut"), my invention designed as above might carry 12 times as much information and be scanned in about $\frac{1}{30}$ of the time, for a figure of merit of 360.

While the film in one section in one film gate is being scanned, the films in the other 19 film gates would be in process of pre-selection to the proper section, there to await the final scanning. As soon as the first film is scanned, the scanner is switched (in a matter of a second or two) to another gate in which the film is at the proper section, and proceeds to scan this second film. In the meantime, the camera has been positioned to the proper column of the first film and proceeds to record the information, after which it shifts rapidly to face the second film, positions itself to the proper column and then waits for the selection of the proper row by the scanner. Although the control circuitry to handle this type of operation is complex, there is considerable art in the field of automatic control of instruments and machines which can be readily applied to this problem. The controls of the reference instruments mentioned above are of this general type. The specific control circuitry is not critical in my system, and it is not considered to be part of this invention.

Figure 11:
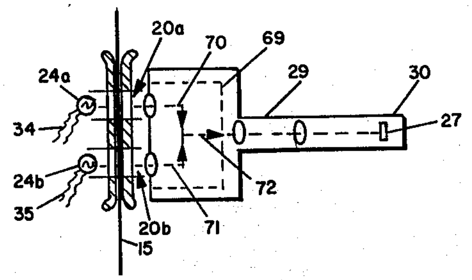
FIGURE 11 illustrates an embodiment of an optical-scanner system adapted to view a given unit of information selectively at each of two film gates.

In selecting the proper row of units of information by the scanner 27, the pattern of spots 48 must be observed as it rapidly traverses through the film gate. On recognition by the scanner that this is the proper row, the controls operate to slow down the film. The film must be stopped, however, at a proper point where the camera 41 can see it. Thus I propose as soon as the pattern 48 passes the top, or leading gate, 20*a* of FIGURE 11, to slow the film to a low speed, and then let it proceed until the pattern 48 appears at the trailing gate 20*b*. These would be far enough apart to ensure that the film would not overrun the trailing gate (to avoid the time and controls it would take to reverse the film). When the pattern 48 reaches the trailing gate the scanner stops the film drive and sets a brake to hold the film centered in the film gate. These controls are not shown but are well known in the art.

There are many instances in the literature and the patent records showing, as in the reference given above, where scanners have been devised to scan the pattern of spots which index a microfilm, to sequentially compare the observed pattern of spots with a predetermined reference pattern of spots. When the observed and reference patterns are identical, controls are energized to stop the transport of the film so that the desired film image can be viewed or photographed. It will be obvious that the same controls that stop the film could be set to slow down the film instead, and a second scanning can act to stop the film. Such controls are considered to be old in the art and do not form part of this invention.

To do this, two separate optical systems and scanners can be used, one directed respectively to each of the film gates 20*a* and 20*b*. However, I prefer to use a single optical system 29 and scanner 27 and to provide an optical device 69, with two objectives directed respectively to each of the two film gates. This device 69, as is well known in the art, takes the images 70 and 71 from the two gates and superimposes them, 72 onto the optical system 29. I show two illumination systems 24*a* and 24*b*, with control leads 34 and 35, respectively placed at gates 20*a* and 20*b*. By controlling the illumination of units 24*a* and 24*b* so that only one is lighted at a time, then one or the other film units in the gates 20*a* and 20*b* will be selectively and rapidly presented to the scanner. The type of scanning control that is well known in the art, that will recognize a particular pattern of spots, can be used to recognized the pattern at gate 20*a* (with lamp 24*a* lighted and lamp 24*b* dark) and upon recognition it can act to slow the film strip, (by switching the film drive to a lower voltage, for example) and at the same time, turn off lamp 24*a* and light lamp 24*b*. The scanner will then watch for the same desired pattern in gate 24*b*, and when it again recognizes the reference pattern, it will again act, this time to stop the film.

It is thus seen that in my design all of the steps required in selecting the proper section of film and the scanning thereof are done simultaneously, instead of in time sequence. This means that the entire operation of searching and photographing can be done more speedily.

It will be clear to those skilled in this art that an apparatus composed of a multiplicity of film reels, rollers, film drives, film gates, take-up reels, selectors, and optical scanner and microfilm camera, with proper positioning drives, etc., can not work without elaborate controls. As a matter of fact, the complexity of the optical and scanning units lies not entirely in the mechanical and optical construction, but also in the electronic control apparatus that is necessary to take the outputs of the optical detectors, compare this information with the identification of the information unit desired, and control the machine operations in accordance with this comparison. While this control system is complex, it is a well known art, and its design is not a part of this invention. Similarly the film selectors, drives, etc., are well known in the art and their individual designs form no part of this invention.

While I have described my invention in terms of the foregoing specific details and embodiments thereof, and have omitted descriptions of much of the control circuity on the basis that it is well known in the art, it will be understood that these are by way of illustration only and do not limit in any way the choice of equivalent units or systems as might be chosen by one skilled in the art, such as the use of the many types of flying spot scanners well known in the art as alternatives to the multiple photoelectric cell array described, and the use of other types of multiple strip storage, without the use of reels, such as the I.B.M. Walnut, and the scope of the invention is properly to be ascertained by reference to the appended claims.

I claim:

1. In an information retrieval system for retrieving information recorded on a microfilm strip in a form including a pattern of spots, the improvement comprising:
   - a scanning system comprising means for scanning said pattern of spots,
   - an optical system for presenting to said scanning system the pattern of spots on said microfilm strip when positioned in an appropriate film gate,
   - a film gate array comprising a multiplicity of film gates arranged in precise geometric-optical relation with respect to said optical system,
   - a multiplicity of microfilm strips arranged to be traversed at least one through each of said multiplicity of film gates,
   - means for simultaneously transporting said film strips through said film gates,
   - means for altering the geometric-optical relation between said film gate array and said optical system in such a way as to place selectively any one of said multiplicity of film gates in precise optical position with respect to said optical system whereby said film strip in said film gate will be in operating relation to said scanning system.

2. An information retrieval system as in claim 1 in which said film strip transport system comprises two film gates spaced in the direction of traverse of the film, said optical system includes optical means for selectively observing the film strip in each of said two film gates, and means for rapidly switching the optical system from one to the other of said film gates, whereby the optical system reading the leading gate and observing the passage of a unit of information can rapidly switch to reading the following gate and detecting the subsequent passage of the same unit of information.

3. An information retrieval system as in claim 2 in which said means for switching the optical system from one gate to the other comprises means for control of the illumination of the two film gates.

4. An information retrieval system as in claim 2 in which the film transport means comprises means to traverse the film at high speed until the desired unit of information reaches the leading film gate, means to decelerate the film to a low speed until it reaches the trailing film gate and means to stop the film when the desired information unit is in the film gate, whereby the microfilm camera can photograph the unit of information.

5. An information retrieval system as in claim 1, in which said optical system and scanning system are mechanically positioned with respect to said film gate array.

6. An information retrieval system as in claim 5, in which said film gates are arranged with radial symmetry and said optical and scanning systems are rotatable about the axis of symmetry of said gates.

7. An information retrieval system as in claim 1, in which an auxiliary optical device is used to present each of said film gates selectively to said optical system.

8. An information retrieval system as in claim 1, in which a multiplicity of microfilm strips are adapted to be successively traversed past each of said multiplicity of film gates.

9. An information retrieval system as in claim 8 in which said multiplicity of film strips are wound respectively on a multiplicity of reels, said reels mounted on a moving system which can successively position each of said reels to direct their strips to the said film gate.

10. An information retrieval system as in claim 8 in which said multiplicity of film strips are wound respectively on a multiplicity of reels, said reels mounted on a fixed support relative to said gate, said reels positioned with respect to conduit means adapted to direct the film strips from each reel selectively through said film gate.

11. An information retrieval system as in claim 1, in which said microfilm strips have index marks corresponding to predetermined sections of said strips, said retrieval system includes detectors for recognizing said index marks, and control means responsive to said detectors for controlling said film transport means whereby said film is placed in said film gate to display a predetermined section of said film.

12. Apparatus as in claim 1 including means associated with each gate for controlling the film in said gate to position a predetermined section of said film in said gate.

13. Apparatus as in claim 1 including radiation recording means associated with said optical system for recording the information on said film in said gate.

14. An information retrieval system as in claim 1, in which said optical system comprises two parts, a first part which images a microfilm onto said scanning system and a second part which images a microfilm onto a photographically sensitive film in a microfilm camera, whereby a photographic copy of said microfilm in said film gate is produced.

15. An information retrieval system as in claim 14, in which one microfilm in one film gate is imaged on said scanning system and a second microfilm in a second film gate is presented to said microfilm camera.

16. An information retrieval system as in claim 14, in which said microfilm contains a multiplicity of columns of units of information and said scanning system can receive an image of one column of said film and said camera receive an image of another column of said film.

17. An information retrieval system as in claim 14, in which each of said units of information may contain at least two parts, one of which is presented to the scanning system and the other to the camera, said two parts being displaced on said film strip a distance corresponding to the distance in the direction of traverse between the effective optical axes of the optical systems serving the scanner and the camera.

18. In an information retrieval system in which an optical scanning system is used to scan a microfilm being traversed past a film gate, the improvement comprising a multiplicity of film gates, each film gate capable of displaying a microfilm, each of said film gates in precise mechanico-optical relation to said scanning system, means for directing said scanning system selectively to any one of said gates, and means for pre-selecting at least one film strip in one gate while simultaneously scanning another film in another gate.

19. A photographic microfilm for storing information in an information retrieval system in which a multiplicity of film strips are run simultaneously respectively through a multiplicity of film gates in precise geometric relation to a scanning system for scanning information on said strip in the form of a pattern of spots, each of said film gates having index detecting means, comprising, a photographic film strip, information recorded on said strip, at least part of said information in the form of a pattern of spots arranged in at least one column of spots, and a multiplicity of index marks having at least one property recognizable by said index detecting means for marking specific dividing points along the length of said strip, whereby said strip is divided into a multiplicity of predetermined recognizable sections.

20. In an information retrieval system in which a multiplicity of microfilm strips are traversed through a multiplicity of film gates, said gates arranged in precise mechanico-optical relation to a single optical scanning system, said scanning system capable of being directed selectively to each of said gates, the method of scanning said microfilms comprising pre-positioning at least one microfilm strip to a predetermined section in a first gate, directing the scanning system to said first gate in which the film strip is pre-positioned to the proper section, pre-positioning a second microfilm strip in a second gate while simultaneously scanning said strip in said first gate until a desired unit of information is found, directing the scanning system to said second gate in which the microfilm strip is pre-positioned to the desired section, and scanning said strip in said second gate while pre-positioning a third microfilm strip in a third gate, whereby the steps of pre-positioning of said strips and the scanning of said strips are carried on simultaneously.

21. In an information retrieval system in which a multiplicity of microfilm strips are traversed through a multiplicity of film gates, said gates arranged in precise mechanico-optical relation to a single optical scanning system, means for photographing a film in any gate, said scanning system and said means for photographing capable of being directed selectively to each of said gates, the method of scanning said microfilms comprising scanning a first strip in one gate while simultaneously photographing another strip in another gate.

22. In an information retrieval system in which a multiplicity of microfilm strips are traversed through a multiplicity of film gates, said gates arranged in precise mechanico-optical relation to a single optical scanning system, said scanning system capable of being directed selectively to each of said gates, the method of scanning said microfilms comprising pre-positioning at least one of a multiplicity of film strips to predetermined sections in a multiplicity of film gates simultaneously with the scanning of one of said film strips in one gate.

23. In an information retrieval system in which a multiplicity of microfilm strips are traversed through a multiplicity of film gates, said gates arranged in precise mechanico-optical relation to a single optical scanning system, said scanning system capable of being directed selectively to each of said gates, the method of scanning said microfilms comprising the steps of simultaneously traversing a multiplicity of microfilm strips to predetermined positions in a multiplicity of film gates while simultaneously scanning one of said gates by said optical scanning system.

24. In an information retrieval system in which a multiplicity of microfilm strips are traversed through a multiplicity of film gates, said gates arranged in precise mechanico-optical relation to a single optical scanning system and each film gate having rough position controls by means of which said films can be pre-positioned to predetermined sections of said films, said scanning system capable of being directed selectively to each of said gates, the method of scanning said microfilms comprising the steps of traversing a multiplicity of microfilm strips in a multiplicity of film gates, scanning the strip in one gate with said scanning system while simultaneously rough positioning the strip in at least one other gate to a predetermined section by said position controls.

25. In an information system for the storage and retrieval of information, at least part of which is in digital form, arranged in a pattern of spots in at least one column of spots, on a strip record, the improvement comprising, a multiplicity of strip record means for the storage of said information, a multiplicity of strip handling means each capable of storing, driving, index detecting and controlling at lease one strip record, including means to transport said strip through said handling means independently of and simultaneously with said other handling means, central scanning means adapted to cooperate selectively and successively with means in each of said handling means to successively scan the information on said strip in said handling means, means for placing siad central scanning means in operating relation with a predetermined one of said handling means, index means on each of said strips to mark the positions of a multiplicity of sections of said strips, and index detection means on each of said handling means and control means responsive to said detection means to position said strips in said handling means to predetermined sections, the positioning to a desired section of at least one strip in one handling means being done simultaneously with the scanning of another strip in another handling means by said central scanning means.

26. In an information system in which information is recorded on a strip record, at least part of said information being in digital form arranged in a pattern of spots in at least one column of spots, a multiplicity of said strips adapted to be run independently and simultaneously through a multiplcity of strip handling means, the improvement comprising, index means on each of said strips marking a multiplicity of predetermined sections on each of said strips, means in each of said strip handling means to drive said strips, means in each of said strip handling means to position said strips to desired sections in said handling means and central scanning means capable of being placed in operating relation successively with each of said strip handling means to read said information.

27. Apparatus as in claim 26 in which said index means comprises markings on said strip of a nature different from that of said information spots on said strip.

28. Apparatus as in claim 26 in which said information strip is a photographic film strip and said reading means comprises a central photo-electric means in operating relation with means in each of said strip handling means.

29. Apparatus as in claim 25 in which said index means comprises light control means and said index detection means is photo-electric.

30. Apparatus as in claim 25 in which said strip record means comprises a digital record strip.

31. Apparatus as in claim 30 in which said digital record strip is photographic.

References Cited in the file of this patent

UNITED STATES PATENTS

| | | |
|---|---|---|
| 1,889,575 | Sebille | Nov. 29, 1932 |
| 2,121,061 | Townsend | June 21, 1938 |
| 2,251,998 | Goodale | Aug. 12, 1941 |
| 2,280,750 | Emerson | Apr. 21, 1942 |
| 2,348,535 | Goodale | May 9, 1944 |
| 2,580,270 | Badgley et al. | Dec. 25, 1951 |
| 2,830,285 | Davis et al. | Apr. 8, 1958 |
| 2,911,884 | Caudle et al. | Nov. 10, 1959 |
| 2,986,967 | Albert et al. | June 6, 1961 |
| 3,041,925 | Bavaro | July 3, 1962 |
| 3,098,409 | Mathieu | July 23, 1963 |

FOREIGN PATENTS

| | | |
|---|---|---|
| 873,895 | Great Britain | Aug. 2, 1961 |